United States Patent Office 2,800,518
Patented July 23, 1957

2,800,518
ACTIVATED ALPHA ALUMINA, ITS FORMATION, AND ITS USE

Emory W. Pitzer, Bartlesville, Okla., assignor to Phillips Petroleum Company, a corporation of Delaware No Drawing. Application October 11, 1949, Serial No. 120,808

18 Claims. (Cl. 260—683.3)

This invention relates to a new material, activated alpha alumina, to methods for forming same, and to various uses of same. In certain of its more specific aspects this invention relates to methods of preparing catalysts, and the catalyst per se, consisting of or comprising as a component thereof, alpha alumina having a surface area of at least 6 square meters per gram. Other specific aspects of the invention pertain to conversion processes wherein reactions are effected in the presence of such catalysts. Still other embodiments of the invention pertain to use of activated alpha alumina as an adsorbent, and as a solid contact material in other operations.

The term "activated alpha alumina" as used herein appears to be self-contradictory, inasmuch as alpha alumina is well known to be an extremely inactive material, both chemically and with respect to surface action. Alpha alumina is extremely resistant to chemical action, and can be put into solution only by exceptional means, such as by dissolving in a fused electrolyte such as cryolite, or by fusion with alkaline materials at high temperatures. It is a very dense substance, and has a surface area seldom in excess of one square meter per gram. Hence it is of no value for use in which surface area plays a role, and cannot be employed as a solid contact material for adsorption, catalysis, or the like. To the best of my knowledge, no one has heretofore produced an alpha alumina which could be termed "activated" in any way.

Alpha alumina is described as follows by Edwards, Frary, and Jeffries, The Aluminum Industry, volume I, Aluminum and Its Production, McGraw-Hill Book Company (1930), pages 164–165.

$\alpha$—$Al_2O_3$ (corundum)

"The oxide $Al_2O_3$ is found widespread in nature as the mineral corundum. $\alpha$-alumina (artificial corundum) melts, according to Kanolt, at 2050° C. According to Wright its refractive indices are $\epsilon=1.760$ and $\omega=1.768$, and its hardness 9, while its mean refractive index is 1.765, according to Rankin and Merwin. Its density is 3.91. It is the form which fused alumina ordinarily takes upon solidification. The hydrates of aluminum are also converted to $\alpha$-alumina upon ignition at high temperatures, above about 1200° C., and slowly at even lower temperatures. The crystal structure of $\alpha$-alumina has been investigated by Davey and Hoffman, Bragg and Bragg, Davey, Maginn, Pauling and Hendricks, and Ullrich."

Footnote references have been deleted in the foregoing quotation, but may be obtained by reference to the book from which the quotation was taken.

In contrast to the properties of alpha alumina, gamma alumina has a high surface area, for example 100 square meters per gram, and is quite active both as a solid contact material for adsorption, as a catalyst per se for many reactions, and as a base material or catalyst support for materials which are catalytic to various reactions either alone or sometimes only when used in conjunction with alumina. Thus gamma alumina may be said to be alumina in an active form.

Gamma alumina is described as follows by Edwards, Frary, and Jeffries, The Aluminum Industry, volume I, Aluminum and Its Production, McGraw-Hill Book Company (1930), page 166.

$\gamma$—$Al_2O_3$

"When aluminum monohydrate or trihydrate are dehydrated by heating, the product first formed is amorphous. When the heating is continued at higher temperatures, say above 500° C., a new phase begins to appear which gives an X-ray pattern different from that of the hydrates [of] alumina. This transition phase may be designated as $\gamma$-alumina. Heating $\gamma$-alumina at temperatures above about 1200° C. results in its conversion to $\alpha$-alumina; the lines of corundum appear faintly on long heating at somewhat lower temperatures. It appears to be the same product listed by Hansen and Brownmiller as $\gamma$-alumina and formed by heating precipitated alumina for 6 hours at 900 to 950° C. Describing it, they state:

'Microscopic examination showed this material to be isotropic with an index of refraction of $1.696\pm0.003$. Its specific gravity was found to be 3.47. This probably is the same as the material reported by Ullrich as $\gamma$-alumina. Its X-ray diffraction pattern does not correspond to that of the $\beta$-alumina described by Rankin and Merwin.'"

Footnote references have been deleted in the foregoing quotation, but may be obtained by reference to the book from which the quotation was taken.

Many commercial processes are based on catalytic operations, and alumina in the gamma form is utilized either alone or as a component of the catalysts in many instances. Many examples of both inorganic and organic reactions are known. Of the former, oxidation of hydrogen sulfide to sulfur dioxide may be cited. Of the latter, the various catalytic conversions of hydrocarbon materials are of great importance, some of these being:
(1) dehydrogenation of normal butane to butenes,
(2) dehydrogenation of normal butenes to butadiene,
(3) cracking of heavy petroleum fractions to gasoline,
(4) polymerization of light hydrocarbons to gasoline,
(5) hydrogenation of unsaturated hydrocarbons to saturated hydrocarbons, (6) isomerization of olefins. Among the organic but not strictly hydrocarbon conversions may be mentioned dehydration of alcohols, formation of alkyl pyridines by reaction of acetaldehyde with ammonia, and many others well known to those skilled in the art.

Catalysts used for these hydrocarbon and other conversion processes are usually classed as synthetic or naturally occurring materials. The synthetic class of catalysts includes coprecipitated gels, impregnated oxides, and single oxides produced from other compounds, as well as various other compositions prepared by one or more chemical reactions. The naturally occurring class of catalysts includes clays and minerals such as bauxite, montmorillonite, and others, either as obtained in nature or with subsequent dehydration, acid activation, or other chemical treatments which do not however completely alter the original material.

Aluminum oxide, which is one of the important catalysts and catalyst bases, may be either a synthetic or a naturally occurring material. If the aluminium oxide is obtained from a natural source and only purified or activated and not changed chemically, it is classified as a natural catalyst; however, if the aluminum oxide is prepared from some other compound of aluminum it is classified as a synthetic catalyst. The synthetic and natural aluminas known to the art as active catalysts and catalyst supports are gamma alumina. Hydrocarbon and other conversion catalysts which contain alumina either as the catalyst itself, as an active catalytic component of the catalyst, or essentially as a catalyst base or support, are prepared from gamma alumina because it is commonly believed to be the only active form of alumina. Alpha alumina has not been used as a catalyst, and seldom as a catalyst support, because in its ordinary state either as obtained from nature or synthetically, it is inactive as described hereinabove.

Other commercial processes than catalytic ones employ alumina as an adsorbent, a desiccant, etc. Here too the gamma form of alumina is used. Often the gamma form gradually becomes converted to the alpha form, by being maintained at elevated temperatures for long periods of time, and when this occurs to too great an extent the adsorbent is discarded because of its inactivity.

The loss of activity of alumina during extended use in a process is generally believed to be caused by the conversion of the active gamma alumina to inactive alpha alumina. When gamma alumina is heated at relatively high temperatures for a short time, it is converted to alpha alumina which is inactive. During use as an adsorbent or a catalyst support, the gamma alumina is gradually converted to alpha alumina and when the proportion of alpha alumina reaches a certain limit, the adsorbent or catalyst is decreased in activity to the extent that it must be replaced with new material. Accidental overheating often permanently destroys the activity of a catalyst in a very short period of time, so that it must be replaced by new catalysts much sooner than would otherwise be necessary.

An object of this invention is to provide a new form of aluminum oxide. Another object of the invention is to provide an alpha alumina having greatly increased surface area over that normally found. A further object is to provide a process for activating alpha alumina. Yet another object is to provide alpha alumina having a surface area of at least 10 square meters per gram capable of effective use as a catalyst per se or as a component of catalyst mixtures. A further object of the invention is to provide an improved process for preparing catalysts for dehydrogenation and other reactions of organic compounds. A still further object is to provide improved processes for effecting catalyzed reactions, both organic and inorganic. Another object is to treat alpha alumina in such a way as to increase its surface area to a value of at least 6 square meters per gram, and in many instances to a value of 20 square meters per gram and higher. Another object of the invention is to provide a catalyst or catalyst base having sufficient surface area to be effective yet consisting essentially of heat-stable alpha alumina, rather than gamma alumina. Another object is to provide an improved chromia-alumina catalyst suitable for dehydrogenation of hydrocarbons. A still further object is to effect the catalytic dehydrogenation of butane in the presence of an improved chromia-alumina type catalyst having a high degree of heat stability. Other objects and advantages of the invention will be apparent to one skilled in the art from the accompanying disclosure and discussion.

I have now found that alpha alumina can be activated by digesting it in a mixture of nitric acid and ammonium nitrate, or less preferably in nitric acid alone or in ammonium nitrate alone. Activated alpha alumina prepared by my method has a higher surface area than unactivated alpha alumina. In a preferred embodiment the digestion is effected by admixing alpha alumina ground sufficiently fine to give intimate contact with the solution, with concentrated aqueous solution of a material selected from the group consisting of nitric acid, ammonuim nitrate, and mixtures of nitric acid with ammonium nitrate. The digestion is ordinarily carried out at an elevated temperature, and preferred temperatures are from 100 to 300° F. The extent of activation, or increase in surface area, is dependent on the temperature, the concentration of reagents, and the time of contact. Ordinarily at least 5 hours digestion time is required for activating the alumina sufficient to provide a surface area of at least 6 square meters per gram, and times within the range of 5 to 50 hours are usually adequate. Sufficient of the solution of nitric acid, ammonium nitrate, or a mixture of the two, should be used to wet the alpha alumina particles adequately.

As stated above, a concentrated aqueous solution is employed, this term being taken in the present specification and claims to mean an aqueous solution at least 35 weight percent of which is composed of nitric acid, ammonium nitrate, or nitric acid plus ammonium nitrate. Although somewhat weaker solutions can be used, it is less convenient and requires a considerably longer period of time to obtain the desired results. A 40 to 80 weight percent nitric acid solution is suitable, the 70 percent concentrated acid of commercial use often being the most convenient form. Ammonium nitrate is highly soluble in water, a saturated solution thereof even at 0° C. containing more than 50 percent ammonium nitrate, and a saturated solution at 100° C. containing about 90 percent ammonium nitrate. Hence any strength of aqueous ammonium nitrate solution of from below 35 weight percent up to 90 weight percent and above is readily attainable and is satisfactory for my purpose. The effect of a given weight of ammonium nitrate appears to be greater than that of the same weight of nitric acid. Thus, approximately twice the weight of $HNO_3$ should be used if nitric acid rather than ammonium nitrate is employed. Quantities of ammonium nitrate from 0.1 to 2 times the weight of alpha alumina to be treated are preferred, while with nitric acid a quantity of from 0.2 to 4 times the weight of alumina is preferably used. In the case of mixtures of the two, the preferred quantities of each will lie within the stated ranges, the proportions usually being chosen in accordance with the fact mentioned above that a given weight of ammonium nitrate is about twice as effective as the same weight of $HNO_3$. For example, if at a given temperature and contact time it is desired to employ a quantity of total reagents near the maximum, one weight of ammonium nitrate and two weights of $HNO_3$ would be suitable, although variations in the proportions may of course be made. On the other hand, if the mixture is desired to be mostly nitric acid, then one might use 3.5 weights of $HNO_3$ and 0.3 weight of ammonium nitrate per 1 weight of alpha alumina. There may be a synergistic effect between nitric acid and ammonium nitrate in some cases. The foregoing figures of course are merely exemplary, and one skilled in the art will readily choose suitable proportions in accordance with the general teachings of the present disclosure, for any particular situation.

The mechanism by which alpha alumina is activated by my procedure is not definitely known. It does not involve a complete solution of the alpha alumina and its reprecipitation in a different form. It is well known that alpha alumina is very resistant to chemical action, and very little if any solution of the alpha alumina actually takes place. However, the treatment described herein changes an alpha alumina having a surface area of one or less square meters per gram to an alpha alumina having a much higher surface area, usually at least 6 square meters per gram, preferably from 10 to 20 or more square meters per gram and even up to 25 square meters per gram and higher. This is quite surprising in view of the well known chemical inertness of alpha alumina. Furthermore, according to analyses by X-ray diffraction, the crystal form of the alumina does not change during digestion in nitric acid, ammonium nitrate, or a mixture of both. After an alumina, which has first been converted entirely to alpha alumina by heating at high temperatures, is digested in the mixture of nitric acid and ammonium nitrate, no trace of any crystal form other than alpha alumina is found. Yet, the resulting alpha alumina has a greatly augmented surface area and has been activated so that it is a satisfactory base for catalysts or can be used as a catalyst per se or as an adsorbent as desired. By retention of the alpha crystal structure however the resulting material is still stable to heat and does not lose activity as rapidly as gamma alumina under the same conditions of use at elevated temperatures.

The surface areas mentioned herein have reference to values determined on alumina which has been ground to a fine powder. While the effects of my invention will be obtained on treating larger sized granules or pellets of alpha alumina, the limited access of my reagents to the internal portions of such particles limits the possibilities of activation of same to such an extent that it is ordinarily necessary to grind the alumina to powdered form prior to treatment. Preferably the ground powder should at least mostly pass a 60 mesh screen, and may well be ground to pass a 200 mesh screen. The important objective is to obtain intimate contact of as much of the alpha alumina as possible with the nitric acid, ammonium nitrate, or mixtures of same. After the activation treatment, the alumina may be filtered from the residual solution if desired, though this is not necessary. The alumina may also be washed after filtration, though this also is not essential. The treated alumina particles, either after filtration with or without washing, or in admixture with the aqueous solution in which they have been digested, are calcined at moderate temperatures, such as 400 to 1200° F., and preferably 700 to 1000° F., for a time sufficient to remove residual water by evaporation and to volatilize nitric acid and/or ammonium nitrate from the particles.

Inasmuch as concentrated aqueous solutions are employed for treating the alpha alumina, it is usually more convenient merely to subject the total digestion mixture to heating to evaporate water and treating agent, rather than to subject the digestion mixture to filtration. The thus volatilized acid and/or ammonium nitrate may readily be recovered for further use in the process. The calcining temperatures should not be so high as to cause a decrease in the surface area. The resulting particles constitute the novel activated alpha alumina of my invention. The activated material can be employed in the powdered form, or if this is not convenient can readily by pilled or pelleted by known means, with or without the addition of other substance of a catalytic nature, to form particles of suitable size for use in catalysis or adsorption processes effected in known manner.

The following examples are provided as illustrative of some of the results obtainable in the practice of certain specific embodiments of my invention. It is to be understood that the examples are by no means exhaustive of all aspects of the invention in its broadest scope.

Example I

Alpha alumina was prepared by heating a gamma alumina (an activated alumina obtained by the Bayer process), powdered to pass a 100-mesh screen, at 2300° F. for 24 hours. According to X-ray diffraction analyses the alumina was in the gamma form before the heat treatment and in the alpha form following the heat treatment.

The resulting alpha alumina was activated by: (1) mixing it with a weight of ammonium nitrate equal to the weight of the alumina plus a weight of 70 percent aqueous nitric acid equal to twice the weight of the alumina, (2) agitating and boiling the mixture in a water-cooled condenser equipped flask for 53 hours, (3) evaporating to dryness and decomposing the ammonium nitrate and nitric acid by heating to 750° F. in a period of 3 hours, (4) calcining the thus-treated alumina at 750° F. for 45 hours. The ammonium nitrate and nitric acid removed from the alumina during the evaporation step are readily recoverable for re-use in the process.

A comparison of the surface areas of the above gamma, alpha, and activated alpha aluminas indicates that the alpha alumina was activated by the ammonium nitrate-nitric acid digestion. The surface areas, obtained by low-temperature nitrogen adsorption by the method of Brunauer, Emmett, and Teller, J. A. C. S. 57, 1754 (1935), were:

| Alumina | Surface Area, Square Meters per Gram |
|---|---|
| (A) Activated Alpha (by treatment of B) | 10.1 |
| (B) Alpha (by strong heating of C) | 0.4 |
| (C) Gamma | 119.4 |

Example II

The method of preparing the activated alpha alumina used to obtain the following data was by digestion with ammonium nitrate and nitric acid in the same way as that reported in Example I, with the exception of the differences shown in the table:

| Batch No. | Percent HNO₃ Used | Digestion Period, Hrs. | Surface Area, Sq. m./g. Before Digestion | Surface Area, Sq. m./g. After Digestion |
|---|---|---|---|---|
| 1 (Example I) | 70 | 53.0 | 0.4 | 10.1 |
| 2 {a | 49 | 68.5 | 4 | 7.4 |
| 2 {b | 49 | 51.5 additional | 7.4 | 20.0 |
| 2 {c | 49 | 50.0 additional | 20.0 | 17.2 |
| 3 | 70 | 47.0 | 4 | 8.8 |

¹ This batch was redigested two times as indicated by lines b and c.

It will be noted that the first redigestion (line b) of batch 2 caused an increase in surface area of 12.6 square meters per gram, while the second redigestion (line c) decreased the surface area by 2.8 square meters. The reason for this is not presently known, but apparently an upper limit in surface area was reached on treating the particular batch of alpha alumina at the particular conditions being used. The maximum area, however, was still 5 times the area of the unactivated alpha alumina.

Batches 2a and 3 on digestion for fairly long periods (68.5 hours and 47.0 hours) both essentially doubled the surface area of the starting unactivated alpha alumina, giving activated alpha alumina of 7.4 and 8.8 square meters per gram, respectively; which can be used where high surface area and resulting high activity are not required.

Batches 1 and 3 under rather similar conditions gave products differing greatly in percentage change in surface area. Here again the reasons are not fully understood, and this serves to illustrate that the final effect is dependent on a number of factors. However, one skilled in the art having now been given the teachings of the present disclosure will readily be able to determine by trial the desired combination of treating conditions for a given alpha alumina which is to be activated to a given extent.

Example III

Alpha alumina is activated by the same procedure described in detail in Example I, but using nitric acid alone. Larger quantities of nitric acid are required as described hereinabove.

Example IV

Alpha alumina is activated by the same procedure described in detail in Example I, using ammonium nitrate alone. The quantity of ammonium nitrate required is somewhat greater than that used in Example I, but not as great as the amount of nitric acid employed when the latter is used alone as in Example III.

Example V

A chromia-beryllia-alumina catalyst was prepared with the activated alpha alumina of Example I. The weight proportions of the named metal oxides, respectively, were 40, 10, and 50. The catalyst was prepared by: (1) digesting the activated alpha alumina (which had stood for some time subsequent to its preparation and which was heated at 750° F. for 12 hours just prior to formation of the catalyst), chromic acid, and beryllium oxide with 2 parts by weight commercial concentrated nitric acid and 1 part by weight $NH_4NO_3$ per weight of total mixed oxides, (2) evaporating the water and decomposing the nitric acid and ammonium nitrate, (3) heating the material at 750° F. for 24 hours, (4) grinding, (5) pilling the catalyst with hydrogenated corn oil (Sterotex) as pilling lubricant and binder, (6) heating the pills to 1000° F. in 3 hours and maintaining that temperature for 21 hours to remove the pilling binder-lubricant.

When this catalyst was used to dehydrogenate technical normal butane at a space velocity of 800 volumes of butane per volume of catalyst per hour, STP and temperature of 1050° F., in a cycle compound of 1-hour onstream periods alternated with regeneration periods, the following results were obtained.

| | Weight percent of feed |
|---|---|
| Total conversion | 25.7 |
| Single-pass yield of normal butenes plus butadiene | 24.3 |
| Ultimate yield of normal butenes plus butadiene | 94.3 |
| Coke deposit on catalyst | 0.7 |

Other catalytic materials known to promote certain desired reactions may be deposited on the activated alpha alumina; examples are $MoO_3$ for hydrogenation, $SiO_2$ or $ZrO_2$ for cracking, $V_2O_5$ for oxidation, and many others which will be known to those skilled in the art.

I claim:

1. An activated alpha alumina having a surface area in the range of 6 to 25 square meters per gram.

2. An improved catalyst comprising a catalytically active material supported on an active alpha alumina having a surface area in the range of 6 to 25 square meters per gram.

3. An improved dehydrogenation catalyst comprising a metal oxide dehydrogenation catalyst in intimate admixture with activated alpha alumina having a surface area in the range of 6 to 25 square meters per gram.

4. A process which comprises digesting alpha alumina substantially free of other solid materials with a liquid concentrated aqueous solution of a material selected from the group consisting of nitric acid, ammonium nitrate and mixtures of nitric acid with ammonium nitrate until the surface area of said alpha alumina has been substantially increased, and heating the resulting admixture to evaporate residual water and volatilize residual amounts of said material but at a temperature and for a time insufficient to decrease the surface area of the thus treated alpha alumina.

5. A process which comprises treating alpha alumina substantially free of other solid materials with a liquid concentrated aqueous solution of a material selected from the group consisting of nitric acid, ammonium nitrate and mixtures of nitric acid with ammonium nitrate at a temperature of from 100 to 300° F. and for a time of at least 5 hours sufficient to produce an activated alpha alumina having a surface area of at least 10 square meters per gram.

6. A method of preparing an active alpha alumina suitable for use as a catalyst support which comprises digesting an alpha alumina having a surface area of not more than 4 square meters per gram substantially free of other solid material in a strong aqueous solution of nitric acid and ammonium nitrate, at a temperature of from 100 to 300° F. and for a time of at least 5 hours to form an alpha alumina of increased surface area, evaporating and decomposing residual ammonium nitrate and nitric acid, and calcining the thus treated alpha alumina at a temperature insufficient to decrease the surface area of same to the starting surface area.

7. A process which comprises subjecting a material consisting essentially of alpha alumina having a surface area of not more than 1 square meter per gram substantially free of other solid materials to digestion with a strong aqueous solution of a material selected from the group consisting of nitric acid, ammonium nitrate and mixtures of nitric acid with ammonium nitrate at a temperature of from 100 to 300° F. and for a time of from 5 to 50 hours, and separating from residual nitrogenous material an activated material whose crystal structure by X-ray analysis consists essentially of alpha alumina free from gamma alumina and whose surface area is at least 6 square meters per gram.

8. A method of preparing a dehydrogenation catalyst which comprises digesting activated alpha alumina having a surface area in the range of 6 to 25 square meters per gram, chromic acid, and beryllium oxide in concentrated nitric acid and ammonium nitrate, evaporating and decomposing the acid and ammonium nitrate, heating the resulting material at 750 F. for 24 hours, forming the thus-treated material into pills in the presence of a lubricant, and heating the pills at 1000° F. to remove the lubricant.

9. A process for the catalytic dehydrogenation of hydrocarbons which comprises subjecting a dehydrogenatable hydrocarbon at dehydrogenation conditions to contact with a dehydrogenation catalyst comprising an intimate admixture of a metal oxide dehydrogenation catalyst and an activated alpha alumina having a surface area of at least 6 square meters per gram.

10. The process of claim 9 wherein the metal oxide is chromium oxide.

11. A process for the catalytic dehydrogenation of n-butane which comprises contacting n-butane under dehydrogenating conditions with a catalyst comprising activated alpha alumina having a surface area of at least 6 square meters per gram and a dehydrogenating metal oxide.

12. A process for the catalytic dehydrogenation of n-butane which comprises contacting n-butane under dehydrogenating conditions with a catalyst comprising activated alpha alumina having a surface area of at least 6 square meters per gram and chromium oxide.

13. A process for the catalytic dehydrogenation of n-butane which comprises contacting n-butane under dehydrogenating conditions with a catalyst comprising activated alpha alumina having a surface area of at least 6 square meters per gram, chromium oxide, and beryllium oxide.

14. A method of preparing a catalyst which comprises digesting alpha alumina in the absence of other solid material in a concentrated aqueous medium containing a material selected from the group consisting of nitric acid, ammonium nitrate, and mixtures of nitric acid and ammonium nitrate until the surface area of the alumina has been increased to at least 6 square meters per gram, heating the resulting mixture so as to drive off volatile materials and activate the alumina, and incorporating a solid catalytic material in the resulting alumina.

15. The method of claim 14 wherein said catalytic material is a metal oxide.

16. The method of claim 14 wherein said catalytic material is chromium oxide.

17. The method of claim 14 wherein said catalytic material is molybdenum oxide.

18. The method of claim 14 wherein said catalytic material is vanadium oxide.

References Cited in the file of this patent

UNITED STATES PATENTS

| 2,209,908 | Weiss | July 30, 1940 |
| 2,246,900 | Schulze et al. | July 24, 1941 |
| 2,311,979 | Corson et al. | Feb. 23, 1943 |
| 2,378,155 | Newsome et al. | June 12, 1945 |
| 2,399,395 | Shriver | Apr. 30, 1946 |

(Other references on following page)

UNITED STATES PATENTS

| | | |
|---|---|---|
| 2,401,802 | Taylor et al. | June 11, 1946 |
| 2,411,806 | Riesmeyer et al. | Nov. 26, 1946 |
| 2,418,270 | Matuszak | Apr. 1, 1947 |
| 2,422,172 | Smith et al. | June 10, 1947 |
| 2,422,372 | Smith et al. | June 17, 1947 |
| 2,450,766 | Nixon et al. | Oct. 5, 1948 |
| 2,474,440 | Smith et al. | June 28, 1949 |
| 2,483,929 | Owen | Oct. 4, 1949 |
| 2,500,920 | Dague et al. | Mar. 21, 1950 |
| 2,585,033 | Pitzer | Feb. 12, 1952 |

FOREIGN PATENTS

| | | |
|---|---|---|
| 2,626 | Great Britain | of 1911 |